(12) United States Patent
Nishida

(10) Patent No.: US 9,578,247 B2
(45) Date of Patent: Feb. 21, 2017

(54) INFORMATION PROCESSING DEVICE, IMAGING DEVICE, INFORMATION PROCESSING METHOD, AND PROGRAM

(71) Applicant: SONY CORPORATION, Minato-ku (JP)

(72) Inventor: Takeshi Nishida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 9 days.

(21) Appl. No.: 14/465,190

(22) Filed: Aug. 21, 2014

(65) Prior Publication Data
US 2015/0062373 A1 Mar. 5, 2015

(30) Foreign Application Priority Data
Aug. 28, 2013 (JP) .................... 2013-176412

(51) Int. Cl.
*H04N 5/232* (2006.01)
*H04N 9/73* (2006.01)
(52) U.S. Cl.
CPC ...... *H04N 5/23293* (2013.01); *H04N 5/23206* (2013.01); *H04N 9/735* (2013.01)

(58) Field of Classification Search
CPC ........................... H04N 5/23293; H04N 9/735
See application file for complete search history.

(56) References Cited

U.S. PATENT DOCUMENTS

| | | | | |
|---|---|---|---|---|
| 2004/0201726 A1* | 10/2004 | Bloom | .................. | H04N 9/735 348/223.1 |
| 2008/0062274 A1* | 3/2008 | Hamamura | ........ | H04N 5/23293 348/223.1 |
| 2010/0020221 A1* | 1/2010 | Tupman | .............. | G06F 3/04883 348/333.01 |
| 2011/0050927 A1* | 3/2011 | Nagoya | .................. | H04N 5/232 348/211.9 |
| 2012/0236162 A1* | 9/2012 | Imamura | ............ | H04N 5/23258 348/207.99 |

* cited by examiner

*Primary Examiner* — Christopher K Peterson
(74) *Attorney, Agent, or Firm* — Oblon, McClelland, Maier & Neustadt, L.L.P.

(57) ABSTRACT

An information processing device includes circuitry configured to generate a white balance evaluation result based on an user designated portion in an image. The circuitry is also configured to control a display of an indication of the white balance evaluation result with the image.

18 Claims, 11 Drawing Sheets

INFORMATION PROCESSING DEVICE, IMAGING DEVICE, INFORMATION PROCESSING METHOD, AND PROGRAM

CROSS REFERENCE TO RELATED APPLICATIONS

This application claims the benefit of Japanese Priority Patent Application JP 2013-176412 filed Aug. 28, 2013, the entire contents of which are incorporated herein by reference.

BACKGROUND

The present disclosure relates to an information processing device, an imaging device, an information processing method, and a program.

In recent years, imaging of images using imaging devices such as digital cameras is being widely performed. In such imaging devices, a white balance process of correcting an image is performed so that a white object is consistently imaged white even under a light source having a different tone such as a fluorescent lamp or an incandescent lamp.

For example, JP 2003-299117A discloses a technique of determining a type of a light source based on an imaged image and performing a white balance process according to the determined type of the light source.

SUMMARY

However, in the technique disclosed in JP 2003-299117A, even when it is possible to determine a white balance to be applied to an image, it is difficult to show the user whether or not a white balance applied to an image is appropriate in an easy-to-understand manner. Thus, it is difficult for the user to determine whether or not a white balance applied to an image is appropriate.

It is desirable to provide an information processing device, an imaging device, an information processing method, and a program which are novel and improved and enable the user to more easily determine whether or not a white balance applied to an image is appropriate.

According to one embodiment, an information processing device is described that includes circuitry configured to generate a white balance evaluation result based on a user designated portion in an image, and control a display of an indication of the white balance evaluation result with the image.

According to an information processing method embodiment, the method includes generating with circuitry a white balance evaluation result based on a user designated portion in an image, and controlling a display of an indication of the white balance evaluation result with the image.

According to a non-transitory computer readable storage medium embodiment, the medium has a program stored therein that when executed by processing circuitry causes the processing circuitry to execute an information processing method, the method includes generating with circuitry a white balance evaluation result based on a user designated portion in an image, and controlling a display of an indication of the white balance evaluation result with the image.

DETAILED DESCRIPTION OF THE EMBODIMENT(S)

Figure 1:
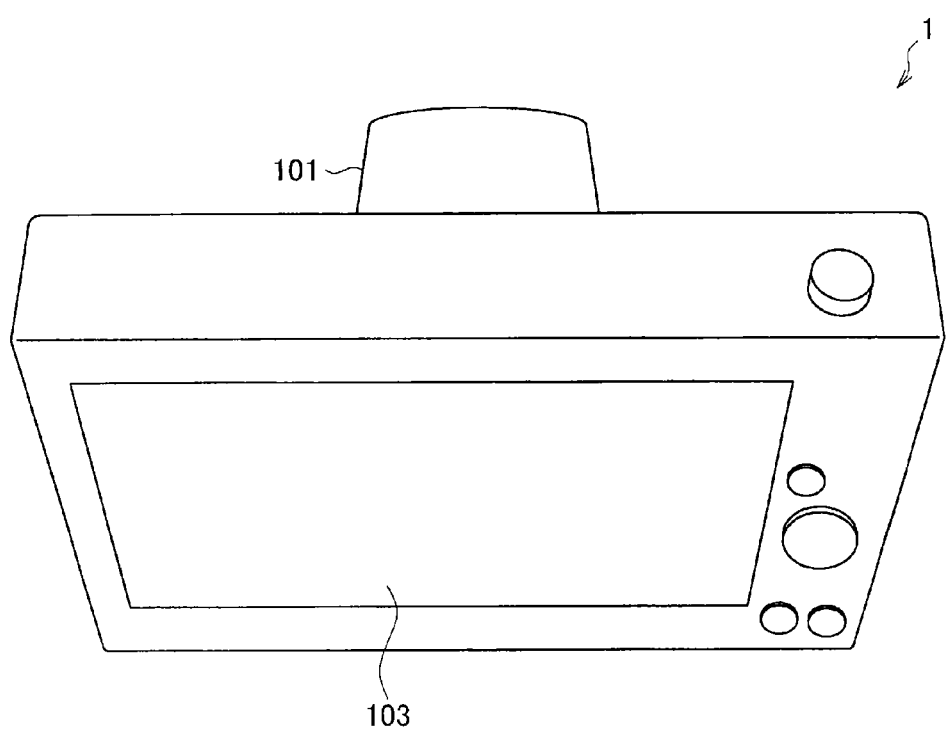
FIG. 1 is an explanatory diagram illustrating an exemplary information processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A description will proceed in the following order.
1. Configuration of information processing device according to embodiment of present disclosure
  1.1. Exemplary external appearance of information processing device
  1.2. Internal configuration of information processing device
2. Operation of information processing device according to embodiment of present disclosure
  2.1. First exemplary operation
  2.2. Second exemplary operation
3. Exemplary hardware configuration of information processing device according to embodiment of present disclosure
4. Conclusion <1. Configuration of Information Processing Device According to Embodiment of Present Disclosure>

Hereinafter, a configuration of an information processing device according to the embodiment of the present disclosure will be described with reference to FIGS. 1 to 8. The information processing device according to the present embodiment of the present disclosure is capable of evaluating a white balance applied to an image and generating a display representing an evaluation result. Thus, the user can more easily determine whether or not a white balance applied to an image is appropriate by checking the evaluation result generated by the information processing device. Further, the user can apply a more appropriate white balance to an image by adjusting a white balance applied to an image while checking the evaluation result generated by the information processing device.

[1.1. Exemplary External Appearance of Information Processing Device]

First, an exemplary external appearance of the information processing device according to the embodiment of the present disclosure will be described with reference to FIG. 1. FIG. 1 is an explanatory diagram illustrating an exemplary information processing device according to the embodiment of the present disclosure.

The information processing device 1 according to the embodiment of the present disclosure is an imaging device including a display unit 103 and an imaging unit 101 as illustrated in FIG. 1. The information processing device 1 displays a preview screen imaged by the imaging unit 101, an imaged image, various kinds of menu screens, or the like through the display unit 103 according to the user's operation.

The imaging unit 101 includes an imaging lens, an imaging element, and the like. The imaging element is configured with a complementary metal oxide semiconductor (CMOS) image sensor, a charge coupled device (CCD) image sensor, or the like, and receives incident light from a subject through the imaging lens, performs photoelectric conversion, and generates an image signal. In other words, the imaging unit 101 can acquire an image of a subject as the subject is imaged.

The display unit 103 is disposed on one surface of the information processing device 1, and displays an image. Specifically, the display unit 103 displays an image which is imaged by the imaging unit 101 and then subjected to a white balance and an evaluation result of the white balance. Through this configuration, the user can adjust and select a white balance while checking an evaluation result of a white balance applied to an image. Thus, the user can acquire an image to which a more appropriate white balance has been applied.

For example, the display unit 103 may be a liquid crystal display (LCD) device or an organic light emitting diode (OLED) device, and the display unit 103 may be a touch panel display device in which an input operation is possible.

The following description will proceed with an example in which the imaging device including the imaging unit 101 and the display unit 103 is described as the information processing device 1 according to the embodiment of the present disclosure. However, the technical content of the present disclosure is not limited to the above embodiment.

For example, the information processing device 1 may include only one of the imaging unit 101 and the display unit 103. For example, the information processing device 1 may be configured to acquire an image on which a white balance evaluation is performed from an external imaging device connected thereto through communication instead of including the imaging unit 101. Further, the information processing device 1 may be configured to cause a display representing a generated white balance evaluation result to be displayed on an external display device connected thereto instead of including the display unit 103.

Further, the information processing device 1 may not include both of the imaging unit 101 and the display unit 103. Specifically, the information processing device 1 may be connected with an imaging device via a network, acquire an image from the imaging device through communication, and evaluate a white balance applied to the image. Further, the information processing device 1 may generate a display representing an evaluation result of the evaluated white balance and transmit the display to the imaging device so that the display is displayed on the imaging device.

Further, for example, a wired local area network (LAN), a wireless LAN, infrared communication, or the like may be used as a communication means among the information processing device 1, the external imaging device, and the display device. Further, the information processing device 1 may perform communication with the external imaging device and the display device via a network or may be connected directly with the external imaging device and the display device and perform communication.

[1.2. Internal Configuration of Information Processing Device]

Figure 2:
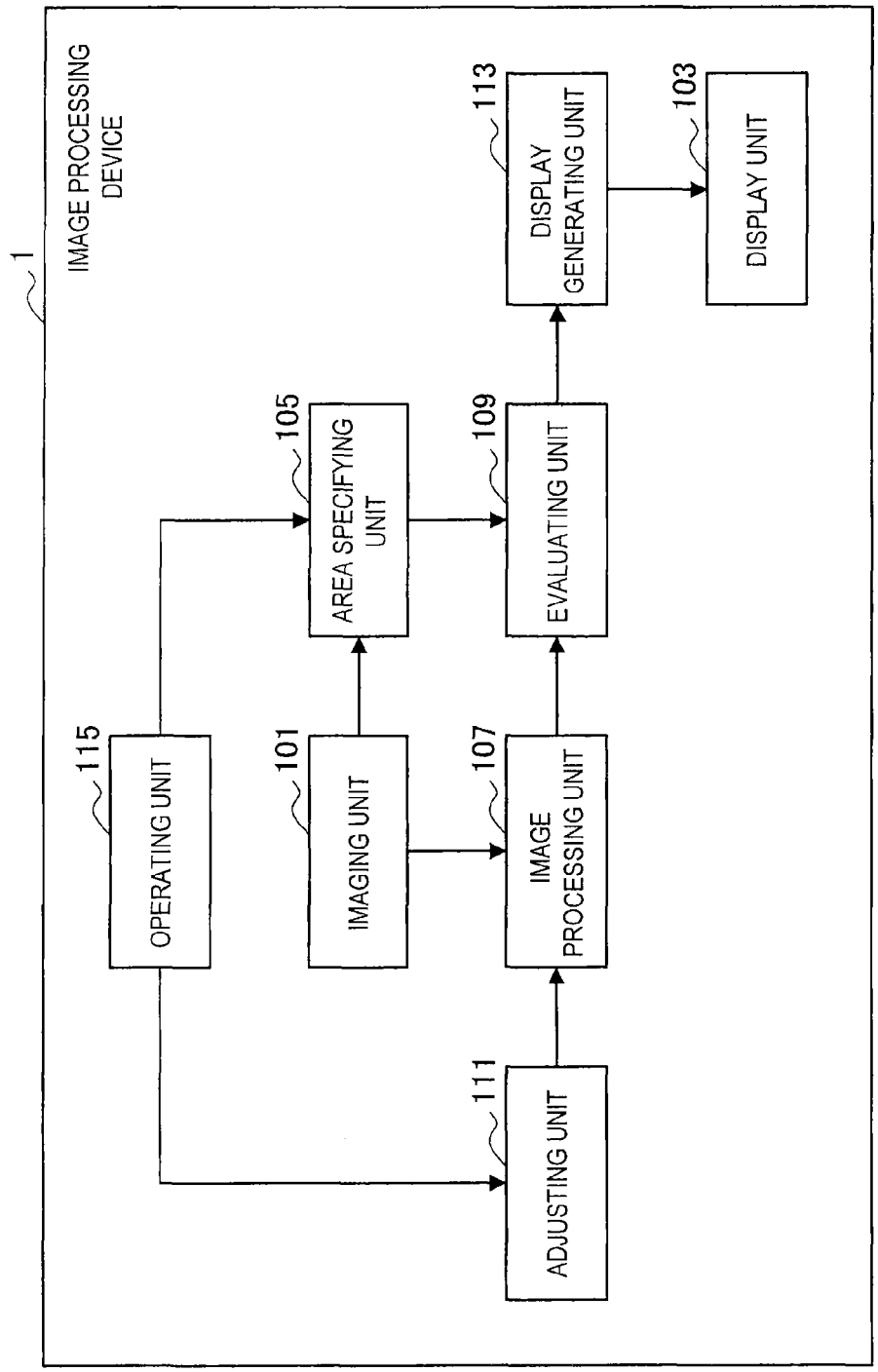
FIG. 2 is an explanatory diagram illustrating an internal configuration of the information processing device according to the embodiment.

Next, an internal configuration of the information processing device 1 according to the embodiment of the present disclosure will be described with reference to FIG. 2. FIG. 2 is an explanatory diagram illustrating an internal configuration of the information processing device 1 according to the embodiment of the present disclosure.

The information processing device 1 includes the imaging unit 101, the display unit 103, an area specifying unit 105, an image processing unit 107, an evaluating unit 109, an adjusting unit 111, a display generating unit 113, and an operating unit 115 as illustrated in FIG. 2.

The imaging unit 101 acquires an image of a subject. Specifically, the imaging unit 101 receives light incident from a subject through an imaging lens through an imaging element, performs photoelectric conversion, and generates an image signal. For example, the imaging unit 101 may be configured with an imaging lens that collects light incident from a subject, a diaphragm that adjusts a light quantity, a shutter that adjusts an exposure period of time, an image sensor that performs photoelectric conversion on incident light, a reading circuit, an amplifying circuit, an analog-to-digital (A/D) converter, and the like.

The display unit 103 displays a display generated by the display generating unit 113 and an image. For example, the display unit 103 may be an LCD device, an OLED device, or the like. Further, the display unit 103 may be a touch panel display device integrated with the operating unit 115 in which an input operation is possible.

The operating unit 115 may be an input device that receives the user's operation. Specifically, the operating unit 115 is configured with an input device through which the user inputs information such as a touch panel, a button, a D-pad, a switch, a lever, a dial, or a microphone, an input control circuit that generates an input signal based on an input by the user, and the like.

For example, the operating unit 115 may be a touch panel device integrated with the display unit 103. In this case, the user can designate an area or adjust a white balance by touching the display unit 103. Further, when the operating unit 115 is a button or a D-pad, the user can designate an area or adjust a white balance by moving a cursor or the like by an operation of a button or a D-pad.

The area specifying unit 105 specifies an area used when the evaluating unit 109 (which will be described later) evaluates a white balance based on the user's designation or RGB data of an image. Specifically, the area specifying unit 105 specifies an area which is determined to have an achromatic color and designated by the operating unit 115 by the user as an area to be used by the evaluating unit 109. Alternatively, the area specifying unit 105 specifies an area which is determined to have an achromatic color based on RGB data of an image acquired by the imaging unit 101 as an area to be used by the evaluating unit 109.

As will be described later, the evaluating unit 109 calculates a distance between coordinates of a color of the area specified by the area specifying unit 105 and coordinates of an achromatic color in a color space, and evaluates a white balance applied to an image based on the distance. Since a white balance is generally applied so that a white color is imaged white, it is preferable that the evaluating unit 109 compare coordinates of a color determined as an achromatic color with coordinates of an achromatic color. Thus, it is preferable that the area specified by the area specifying unit 105 have a color determined as an achromatic color.

Here, in this specification, an achromatic color refers to a color obtained by mixing white and black. For example, an achromatic color is a generic term for a color including white, black, and various concentrations of grey.

Further, RGB data is data representing a color in an image according to how much of each of the three elements red, green, and blue is included. In RGB data, a color is expressed as white when all three of the elements have a maximum value, and a color is expressed as black when all three of the elements have a minimum value.

Figure 3:
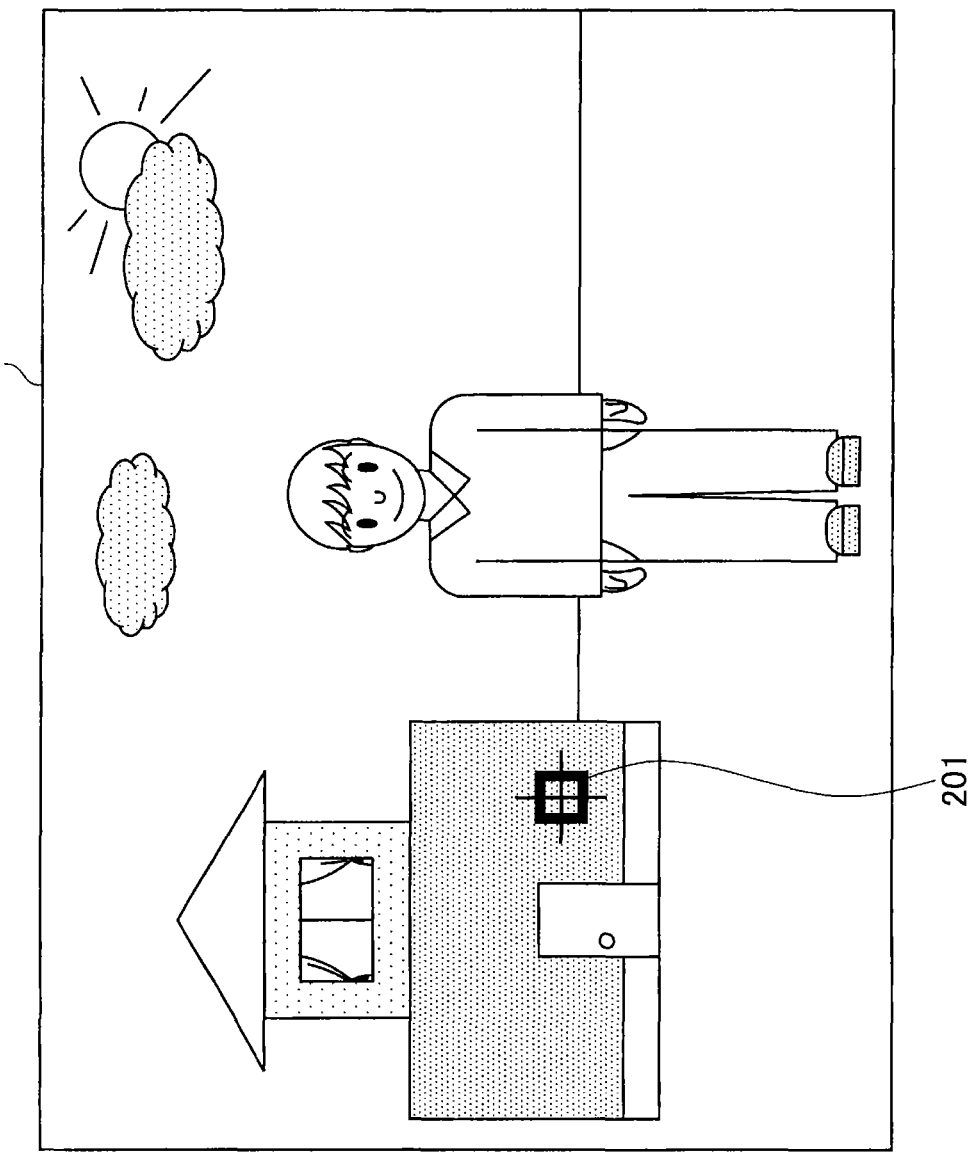
FIG. 3 is an explanatory diagram illustrating an exemplary image when an area is specified by a user's designation.

Next, the function of the area specifying unit 105 will be more specifically described with reference to FIGS. 3 and 4. FIG. 3 is an explanatory diagram illustrating an exemplary image when an area is specified by the user's designation, and FIG. 4 is an explanatory diagram illustrating an exemplary image when an area is specified by a determination by the area specifying unit 105.

In FIG. 3, an image 200 is an exemplary image when the area specifying unit 105 specifies an area based on the user's designation. As illustrated in FIG. 3, a cursor 201 in which a cross is combined with a square is displayed on the image 200. The user can designate an area of a color determined as an achromatic color by the user by operating the cursor 201 using the operating unit 115. For example, in the image 200, since the user has determined that a wall of a building has an achromatic color, a part of the wall of the building has been designated by the cursor 201. In this case, the area specifying unit 105 specifies an area surrounded by the square of the cursor 201 as an area to be used by the evaluating unit 109.

Further, the area specifying unit 105 may receive an area designated by the user by a method other than the cursor 201. For example, the area specifying unit 105 may divide an image into small areas (for example, a total of 36 small areas obtained by dividing an image into 6 vertically and 6 horizontally) having the same size, cause the user to select one of the small areas, and specify the small area selected by the user as the area to be used by the evaluating unit 109.

Figure 4:
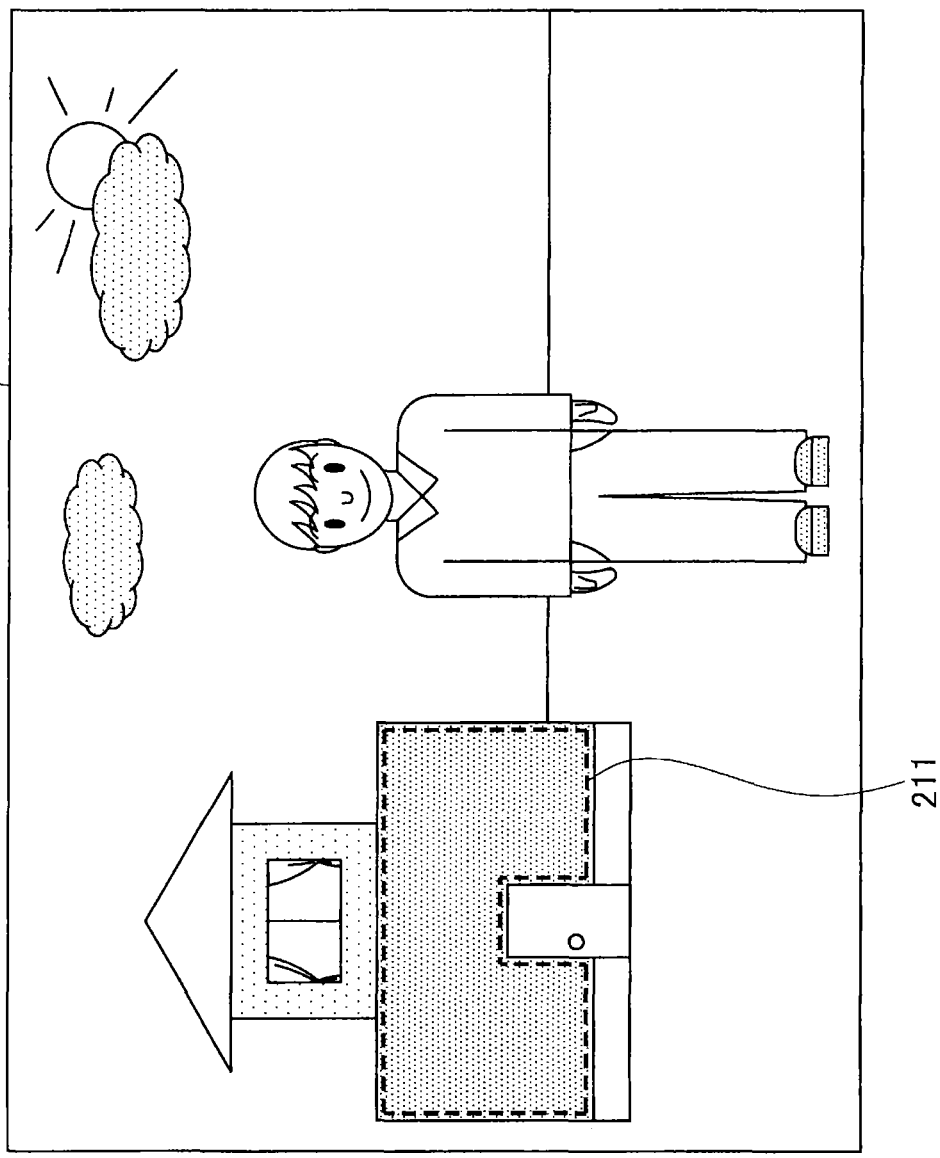
FIG. 4 is an explanatory diagram illustrating an exemplary image when an area is specified by a determination by an area specifying unit.

Meanwhile, in FIG. 4, the image 210 is an exemplary image when the area specifying unit 105 specifies an area based on RGB data of an image. As illustrated in FIG. 4, in the image 210, an area 211 determined to have an achromatic color has been specified by the area specifying unit 105. Specifically, first, the area specifying unit 105 plots a color of each area in the image acquired by the imaging unit 101 using a two-dimensional coordinate system of R/G and R/B generated from the RGB data. Further, the area specifying unit 105 determines that a color plotted within a certain distance from coordinates of an achromatic color in the two-dimensional coordinate system is an achromatic color, and specifies the area 211 having this color as the area to be used by the evaluating unit 109. For example, in the image 210, since the area specifying unit 105 determines a color of the wall of the building as an achromatic color, the area 211 of the entire wall of the building having the color determined to be an achromatic color is specified as the area to be used by the evaluating unit 109.

Further, for example, the area specifying unit 105 may specify the entire image as the area to be used by the evaluating unit 109. In this case, the evaluating unit 109 may evaluate a white balance applied to an image using a distance between average coordinates of coordinates of colors of the entire image and coordinates of an achromatic color.

A method of determining whether or not a color of each area in an image is an achromatic color through the area specifying unit 105 is not limited to the above-described method using the two-dimensional coordinate system of R/G and R/B. As a method of determining whether or not a color of each area in an image is an achromatic color, various other kinds of known methods may be employed.

Referring back to FIG. 2, the description of the internal configuration of the information processing device 1 is continued.

The image processing unit 107 applies a white balance to the image acquired by the imaging unit 101. Specifically, the image processing unit 107 estimates a type of a light source based on RGB data of the image acquired by the imaging unit 101, and applies a white balance set to each light source to the image.

For example, the image processing unit 107 may estimate a light source by calculating a weighted average of the RGB data of the image acquired by the imaging unit 101 in the two-dimensional coordinate system of R/G and B/G and comparing coordinates of the weighted average value with coordinates of a representative value obtained when imaging is performed under each light source. Further, the image processing unit 107 may estimate a light source using a color temperature plane instead of the two-dimensional coordinate system of R/G and B/G, and the image processing unit 107 may estimate a light source using mirror-reflected light. Further, the image processing unit 107 may apply a white balance corresponding to each light source or each color temperature prepared in the information processing device 1 in advance to an image instead of estimating a light source.

A method of calculating a white balance to be applied by the image processing unit 107 is not limited to the above example. As a method of calculating a white balance, various kinds of known methods may be used.

The evaluating unit 109 evaluates a white balance applied to an image by the image processing unit 107. Specifically, the evaluating unit 109 calculates a distance between coordinates of the color of the area specified by the area specifying unit 105 and coordinates of an achromatic color in a color space. For example, when the Lab space is used as the color space, the evaluating unit 109 converts the color space of the image into the Lab space, and calculates a distance between coordinates of the color of the area specified by the area specifying unit 105 and the original point (x=0, y=0) in the Lab space. In this configuration, the distance between coordinates of the color of the area specified by the area specifying unit 105 and coordinates of an achromatic color corresponds to a white balance evaluation.

Further, the evaluating unit 109 may convert the calculated distance into a score or the like and evaluate an applied white balance based on a score. For example, the evaluating unit 109 may evaluate an applied white balance in the form of "score of 0 to 100 points on a 100-point scale." Further, in addition to the distance between coordinates of a color of a specified area and coordinates of an achromatic color, the evaluating unit 109 may transfer a positional relation between the respective coordinates to the display generating unit 113.

Here, besides the Lab space, for example, an R/G plane, a B/G plane, a CrCb plane, or an XYZ space may be used as a color space used when the evaluating unit 109 evaluates a white balance applied to an image. As a color space used when the evaluating unit 109 evaluates a white balance, various kinds of known color spaces may be employed.

Further, when the area specified by the area specifying unit 105 has a plurality of colors as well as achromatic colors, the evaluating unit 109 may calculate a distance between average coordinates of coordinates of colors included in the area specified by the area specifying unit 105 and coordinates of an achromatic color in the color space.

A method of evaluating a white balance through the evaluating unit 109 is not limited to the above example. For example, the evaluating unit 109 evaluates a white balance based on a processing amount of a white balance applied to an image by the image processing unit 107. Specifically, the evaluating unit 109 acquires a processing amount when a white balance is applied to an image obtained by imaging a subject (for example, a standard reflecting plate of 18% grey) having an achromatic color on the entire surface in advance as a standard processing amount. Further, the evaluating unit 109 may evaluate a white balance applied to an imaged image by comparing a processing amount of a white balance applied to an imaged image with the standard processing amount.

The adjusting unit 111 adjusts a white balance applied to an image. Specifically, the adjusting unit 111 further adjusts a white balance applied to an image based on the user's instruction.

For example, the adjusting unit 111 may adjust a white balance by increasing and changing a processing amount of a white balance in a direction of green, magenta, amber, blue, or the like based on the user's input. Further, the adjusting unit 111 may adjust a white balance by changing a color temperature corresponding to a white balance based on the user's input.

Through this configuration, when a white balance applied to an image is adjusted based on the user's input, the user can adjust a white balance while checking evaluation results before and after adjustment.

Further, the adjusting unit 111 may adjust a white balance by sequentially changing a white balance to be applied to an image using a plurality of white balances (for example, for an incandescent lamp, for a fluorescent lamp, for clear sunlight, or the like) prepared in the information processing device 1 in advance. Further, a white balance to be applied may be sequentially changed using a plurality of white balances prepared in the information processing device 1 in advance based on the user's input or a determination by the adjusting unit 111.

Through this configuration, when a white balance is adjusted by sequentially applying a plurality of white balances to an image, the user can determine an optimal white balance based on the evaluation result obtained by the evaluating unit 109. Thus, the user can more appropriately adjust a white balance applied to an image.

Here, when a white balance applied to an image has been adjusted by the adjusting unit 111, the image processing unit 107 and the evaluating unit 109 applies an adjusted white balance to an image again, and evaluates the white balance. Further, the display generating unit 113 generates an image to which the adjusted white balance has been applied and a display representing an evaluation result obtained by the evaluating unit 109.

The display generating unit 113 generates a display representing an evaluation result of a white balance obtained by the evaluating unit 109. Specifically, the display generating unit 113 generates a display representing an evaluation result of a white balance obtained by the evaluating unit 109 such as a score, a classification, a gauge, or a meter or a display obtained by a combination thereof based on the evaluation result. Further, when the distance in the color space calculated by the evaluating unit 109 exceeds a threshold value, the display generating unit 113 may generate a display such as "it is difficult to evaluate a white balance."

Further, the display generating unit 113 may generate a display of an image which has been subjected to a white balance by the image processing unit 107. According to this configuration, the user can check an image to which a white balance has been applied through the display unit 103. Thus, the user can check an image which has been subjected to a white balance evaluated by the evaluating unit 109 together with an evaluation result.

In addition, the display generating unit 113 may generate a display related to adjustment of a white balance for the user based on the evaluation result obtained by the evaluating unit 109. Specifically, the display generating unit 113 acquires a positional relation between coordinates of a color of a specified area and coordinates of an achromatic color in the color space from the evaluating unit 109. Further, the display generating unit 113 generates a display showing a tone direction in which an applied white balance has deviated to the user based on the positional relation of the respective coordinates. Through this configuration, when a white balance is adjusted using the adjusting unit 111, the user can check a tone direction in which adjustment has to be performed. Thus, the user can more appropriately adjust a white balance applied to an image.

Figure 5:
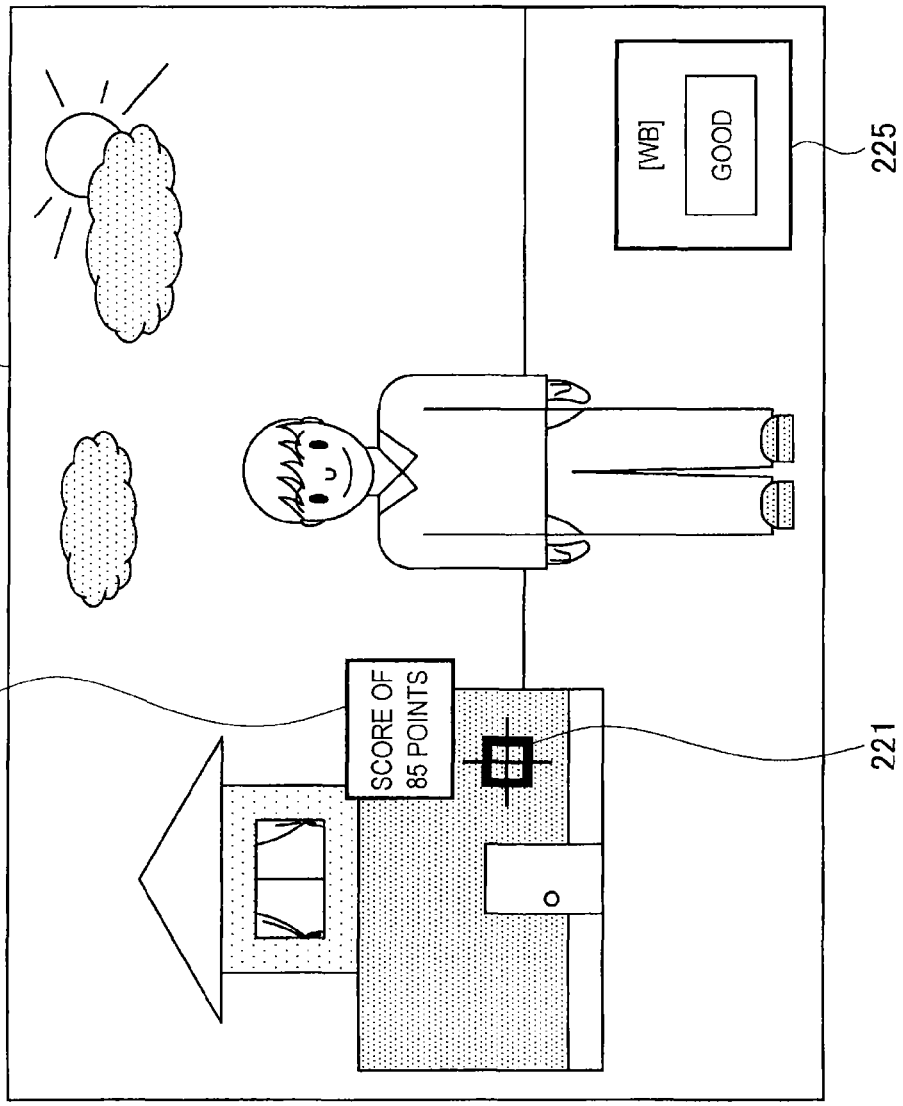
FIG. 5 is an explanatory diagram illustrating an exemplary display representing an evaluation result generated by a display generating unit.
Figure 6:
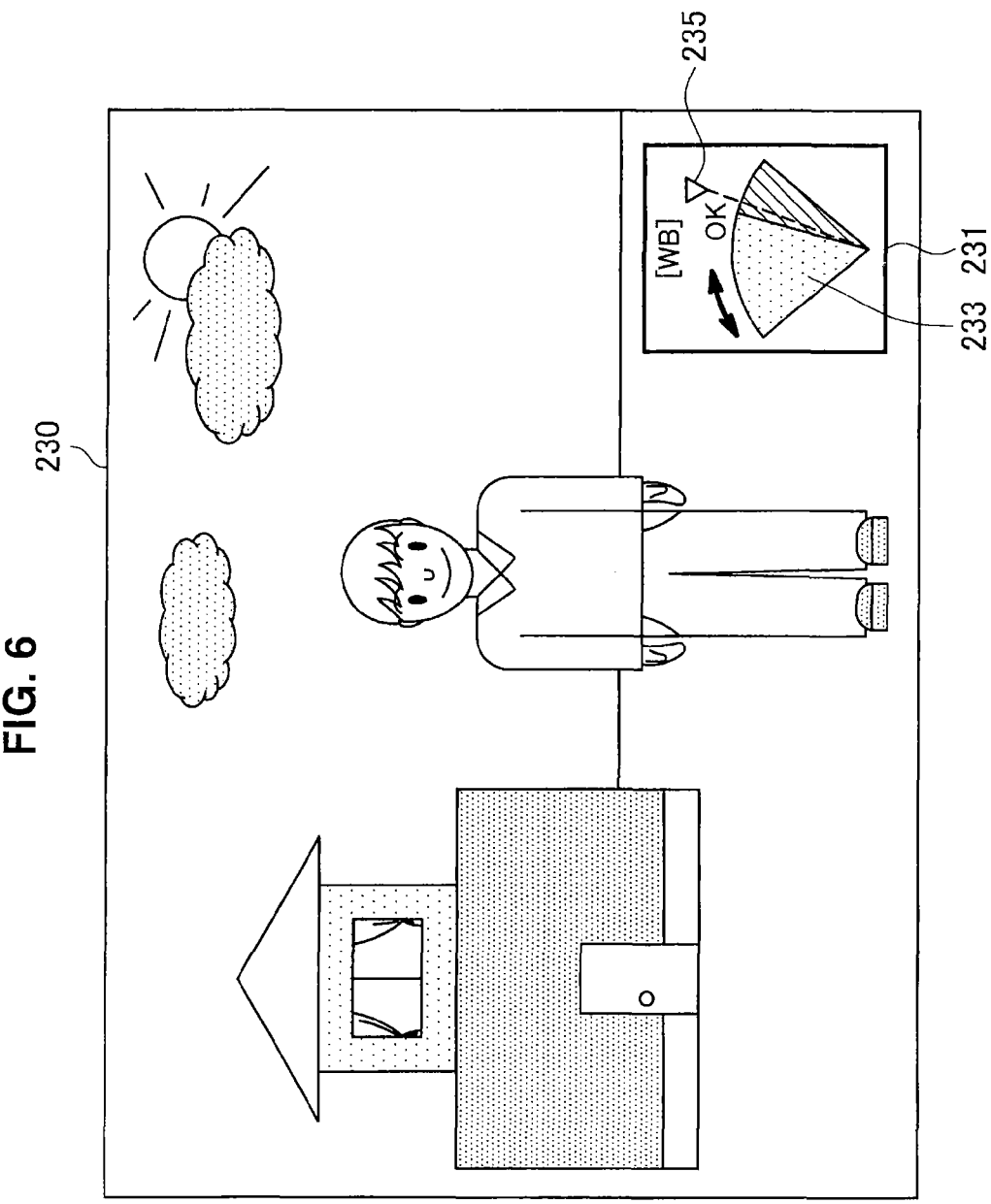
FIG. 6 is an explanatory diagram illustrating an exemplary display representing an evaluation result generated by a display generating unit.
Figure 7:
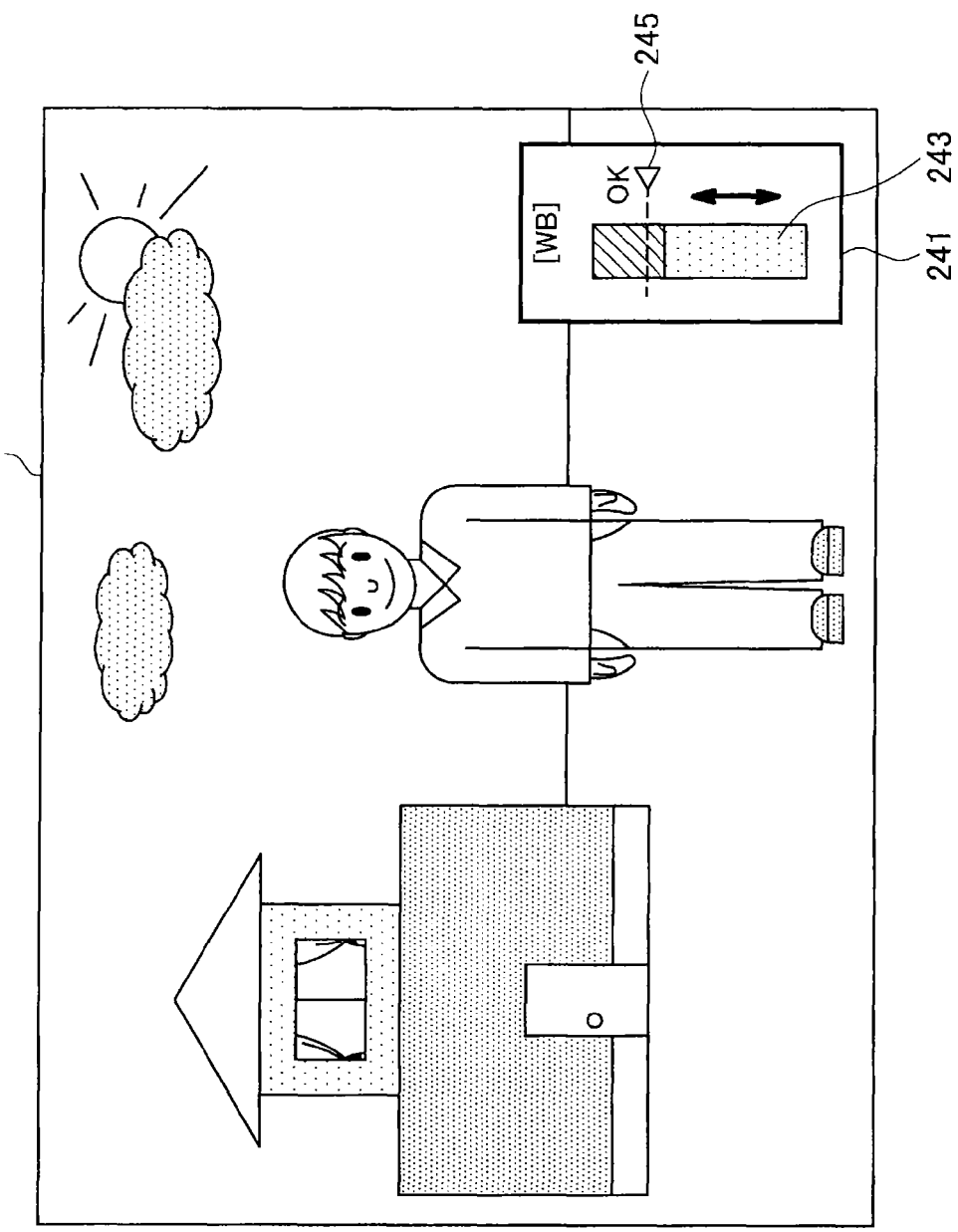
FIG. 7 is an explanatory diagram illustrating an exemplary display representing an evaluation result generated by a display generating unit.
Figure 8:
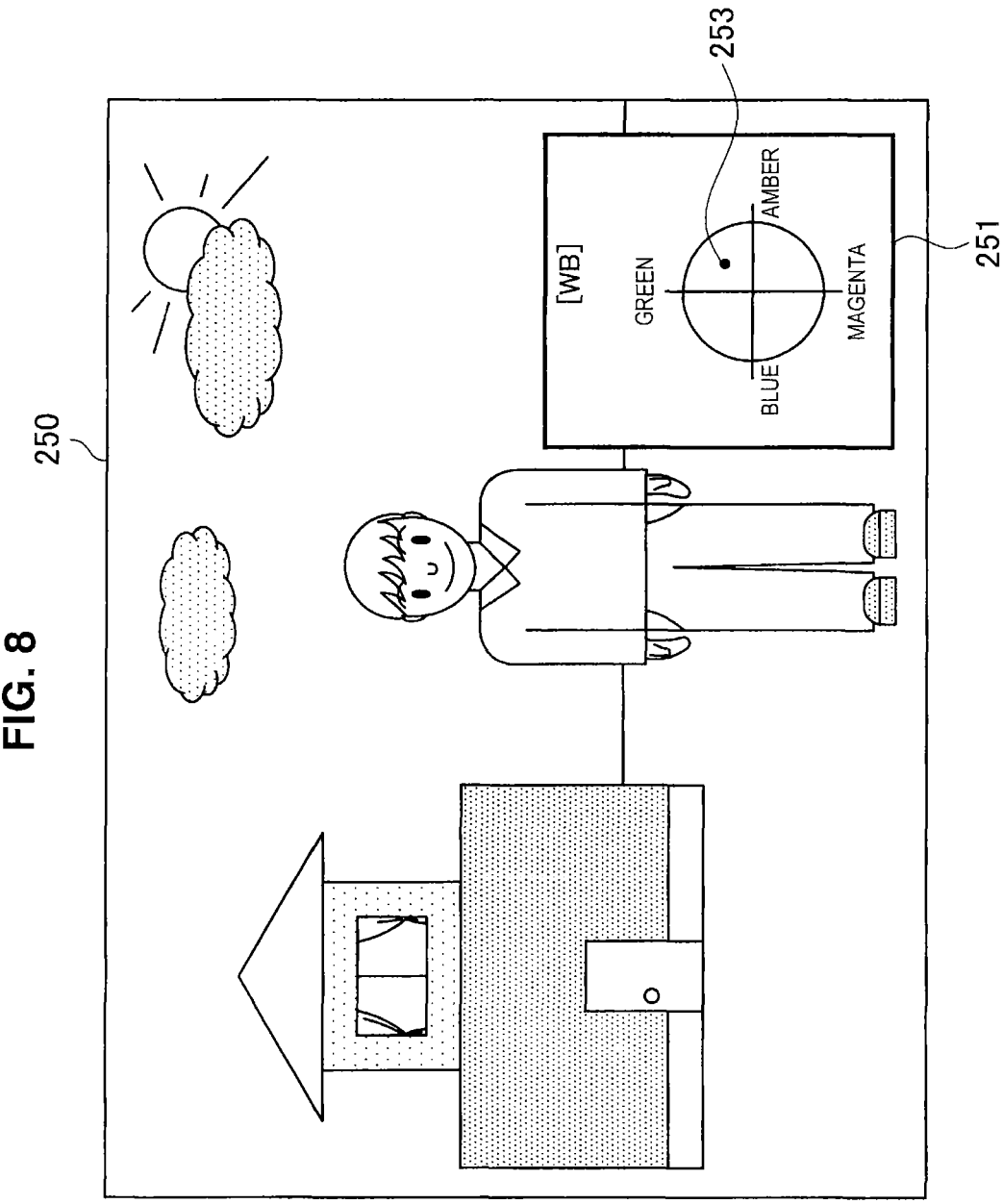
FIG. 8 is an explanatory diagram illustrating an exemplary display showing a white balance adjustment policy to a user.

Here, a concrete example of a display representing an evaluation result of a white balance generated by the display generating unit 113 will be described in further detail with reference to FIGS. 5 to 8. FIGS. 5 to 7 are explanatory diagrams illustrating exemplary displays representing evaluation results generated by the display generating unit 113. FIG. 8 is an explanatory diagram illustrating an exemplary display showing a white balance adjustment policy to the user.

In FIG. 5, an image 220 is an exemplary image including a score display 223 and a classification display 225 generated by the display generating unit 113 as a display representing an evaluation result obtained by the evaluating unit 109. As illustrated in FIG. 5, in the image 220, "score of 85 points" is displayed near an area 221 specified by the area specifying unit 105 as the score display 223, and "good" is displayed at the lower right of the image 220 as the classification display 225. Here, as the score displayed through the score display 223, a score evaluated by the evaluating unit 109 may be used when the evaluating unit 109 obtains an evaluation result of a white balance in the form of a score. However, when the evaluating unit 109 obtains an evaluation result of a white balance in a form other than a score, the display generating unit 113 may convert a distance, in the color space, calculated by the evaluating unit 109 into a score display and generate a display.

Further, a classification to be display through the classification display 225 may be, for example, "good," "slightly good," "slightly bad," "bad," or the like. The display generating unit 113 determines a classification to which a distance in the color space or an evaluation result calculated by the evaluating unit 109 corresponds to generate the classification display 225.

In FIG. 5, a position at which the score display 223 and the classification display 225 are displayed is not limited to the above example. The score display 223 and the classification display 225 may be displayed at any position on the image 220.

In FIG. 6, an image 230 is an exemplary image including a meter display 231 generated by the display generating unit 113 as a display representing an evaluation result obtained by the evaluating unit 109. As illustrated in FIG. 6, in the image 230, the meter display 231 is displayed on the lower right as an evaluation result of a white balance applied to an image. Specifically, the meter display 231 shows an evaluation result obtained by the evaluating unit 109 to the user by increasing or decreasing a central angle of an expansible sector 233 in the meter display 231 based on the evaluation result obtained by the evaluating unit 109.

Here, when the evaluating unit 109 obtains an evaluation result of a white balance in the form of a score, the display generating unit 113 may express the highest evaluation score (for example, 100 points) obtained by the evaluating unit 109 using the largest central angle of the expansible sector 233. Further, the display generating unit 113 may express the smallest evaluation score (for example, 0 points) obtained by the evaluating unit 109 using the central angle of 0° of the expansible sector 233, that is, by causing the expansible sector 233 not to be displayed. Meanwhile, when the evaluating unit 109 obtains an evaluation result of a white balance in a form other than a score, the display generating unit 113 may determine the central angle of the expansible sector 233 according to a distance in the color space or an evaluation result calculated by the evaluating unit 109 to generate a display.

In addition, the display generating unit 113 may display a threshold value by which an image is determined to have a natural tone by an applied white balance using an OK display 235 in the meter display 231. According to this configuration, the user can use exceeding the OK display 235 as an adjustment end indication when a white balance applied to an image is adjusted. Thus, the user can appropriately adjust a white balance applied to an image in a short period of time.

In FIG. 6, a position at which the meter display 231 is displayed is not limited to the above example. It goes without saying that the meter display 231 may be displayed at any position on the image 230.

In FIG. 7, an image 240 is an exemplary image including a gauge display 241 generated by the display generating unit 113 as a display representing an evaluation result obtained by the evaluating unit 109. As illustrated in FIG. 7, in the image 240, the gauge display 241 is displayed on the lower right as an evaluation result of a white balance applied to an image. Specifically, the gauge display 241 shows an evaluation result obtained by the evaluating unit 109 to the user by increasing or decreasing the length of an expansible bar 243 in the gauge display 241 based on the evaluation result obtained by the evaluating unit 109.

Here, when the evaluating unit 109 obtains an evaluation result of a white balance in the form of a score, the display generating unit 113 may express the highest evaluation score (for example, 100 points) obtained by the evaluating unit 109 using the largest length of the expansible bar 243. Further, the display generating unit 113 may express the smallest evaluation score (for example, 0 points) obtained by the evaluating unit 109 by causing the length of the expansible bar 243 to be zero (0), that is, by causing the expansible bar 243 not to be displayed. Meanwhile, when the evaluating unit 109 obtains an evaluation result of a white balance in a form other than a score, the display generating unit 113 may determine the length of the expansible bar 243 according to a distance in the color space or an evaluation result calculated by the evaluating unit 109 to generate a display.

In addition, similarly, the display generating unit 113 may display a threshold value by which an image is determined to have a natural tone by an applied white balance using an OK display 245 in the gauge display 241. According to this configuration, the user can use exceeding the OK display 245 as an adjustment end indication when a white balance applied to an image is adjusted. Thus, the user can appropriately adjust a white balance applied to an image in a short period of time.

In FIG. 7, a position at which the gauge display 241 is displayed is not limited to the above example. It goes without saying that the gauge display 241 may be displayed at any position on the image 240.

In FIG. 8, an image 250 is an exemplary image including a coordinate plan display 251 generated by the display generating unit 113 as a display showing a white balance adjustment policy to the user. As illustrated in FIG. 8, in the image 250, the coordinate plan display 251 representing a tone direction in which an applied white balance has deviated is displayed on the lower right. Specifically, the coordinate plan display 251 includes a green-magenta axis and an amber-blue axis, and a tone direction in which a white balance applied to an image has deviated in the color space is displayed using a coordinate point 253. For example, it can be understood that in the image 250, a tone of a white balance has deviated toward green and amber based on the coordinate plan display 251 and the coordinate point 253.

Further, besides the coordinate plan display 251, the display generating unit 113 may generate a display by text such as "deviated toward green and amber" as a display showing a white balance adjustment policy to the user.

Through this configuration, the user can understand a tone direction in which it is desirable to adjust a white balance applied to an image. Thus, the user can apply a more appropriate white balance to an image by adjusting a white balance while checking the coordinate plan display 251.

As described above, according to the information processing device 1 according to the embodiment of the present disclosure, it is possible to evaluate a white balance applied to an image and generate a display representing an evaluation result. Specifically, the information processing device 1 according to the embodiment of the present disclosure specifies an area determined to have an achromatic color on an image to which a white balance has been applied, and calculates a distance between coordinates of a color of the area and coordinates of an achromatic color in the color space. Further, the information processing device 1 evaluates a white balance applied to an image based on the calculated distance, and generates a display representing an evaluation result. Through this configuration, the information processing device 1 according to the embodiment of the present disclosure can help the user more easily determine whether or not a white balance applied to an image is appropriate.

Further, the information processing device 1 can help the user to adjust and select a white balance while checking an evaluation result of a white balance applied to an image. Thus, the user can apply a more appropriate white balance to an image.

<2. Operation of Information Processing Device According to Embodiment of Present Disclosure>

Figure 9:
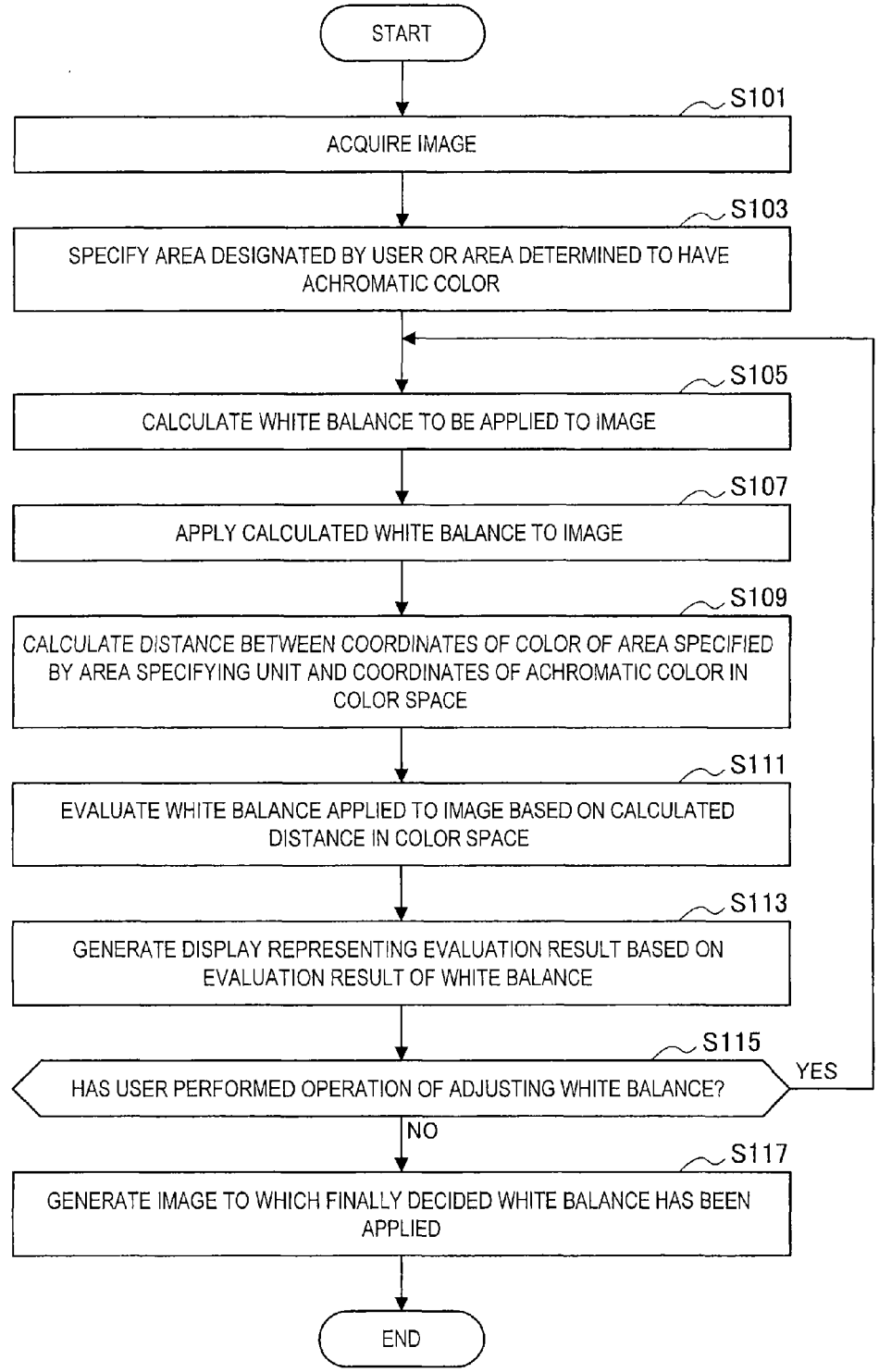
FIG. 9 is a flowchart for describing a first exemplary operation of the information processing device according to the embodiment.
Figure 10:
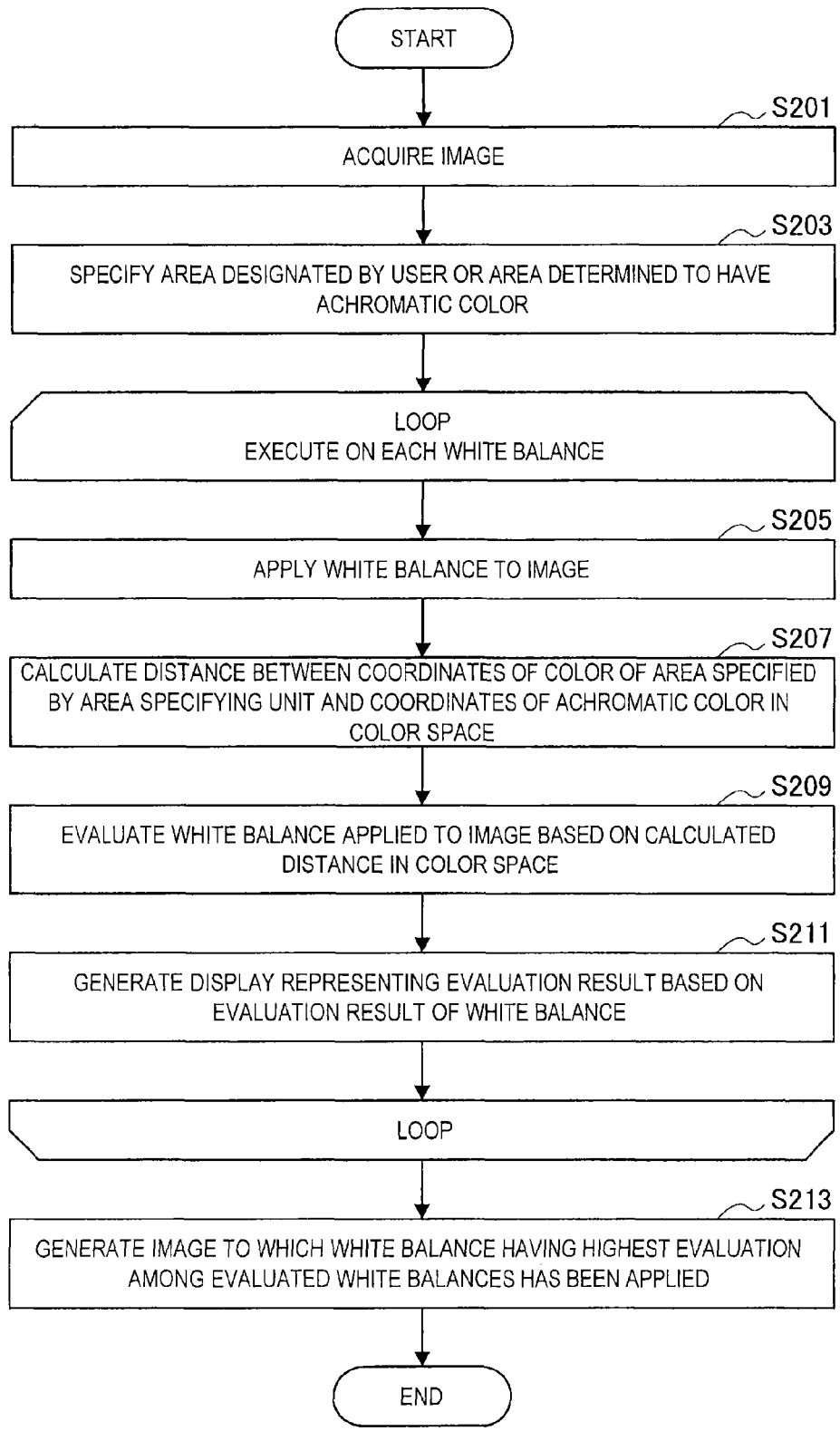
FIG. 10 is a flowchart for describing a second exemplary operation of the information processing device according to the embodiment.

Next, an operation of the information processing device 1 according to the embodiment of the present disclosure will be described with reference to FIGS. 9 and 10. FIG. 9 is a flowchart for describing a first exemplary operation of the information processing device 1 according to the embodiment of the present disclosure, and FIG. 10 is a flowchart for describing a second exemplary operation of the information processing device 1 according to the embodiment of the present disclosure.

[2.1. First Exemplary Operation]

First, the first exemplary operation of the information processing device 1 according to the embodiment of the present disclosure will be described with reference to FIG. 9. The first exemplary operation is an example operation in which the adjusting unit 111 adjusts a white balance applied to an image based on the user's input. For example, the first exemplary operation is an example operation in which the adjusting unit 111 adjusts a processing amount of a white balance in the directions of green, magenta, amber, and blue based on the user's input.

As illustrated in FIG. 9, first, the imaging unit 101 acquires an image (S101). Then, the area specifying unit 105 specifies an area designated by the user or an area determined to have an achromatic color by the area specifying unit 105 in the acquired image (S103). Then, the image processing unit 107 estimates a light source based on, for example, RGB data of the acquired image, and calculates a white balance to be applied to the image (S105). Further, the image processing unit 107 applies the calculated white balance to the image (S107).

Further, the evaluating unit 109 calculates a distance between coordinates of a color of the area specified by the area specifying unit 105 and coordinates of an achromatic color in the color space (S109). Further, the evaluating unit 109 evaluates a white balance applied to an image based on the calculated distance in the color space (S111). Then, the display generating unit 113 generates a display representing an evaluation result based on an evaluation result of the white balance obtained by the evaluating unit 109 (S113).

Then, the adjusting unit 111 determines whether or not the user has adjusted a white balance (S115). When it is determined that the user has adjusted a white balance (YES in S115), the information processing device 1 returns to S105, calculates a white balance to be applied to an image by the image processing unit 107, and applies the calculated white balance to the image. Further, when it is determined that the user has not adjusted a white balance (NO in S115), the adjusting unit 111 determines the white balance which has been performed on the image at that point in time as a finally decided white balance. In this case, the display generating unit 113 generates an image to which the finally decided white balance has been applied (S117).

According to the exemplary operation of the information processing device 1, the user can adjust a white balance to be applied to an image while checking a displayed evaluation result of a white balance. Thus, the user can apply a more appropriate white balance to an image.

[2.2. Second Exemplary Operation]

Next, the second exemplary operation of the information processing device according to the embodiment of the present disclosure will be described with reference to FIG. 10. The second exemplary operation is an example operation in which the adjusting unit 111 sequentially applies a plurality of white balances prepared in the information processing device 1 in advance to an image, and finally applies a white balance having the best evaluation result obtained by the evaluating unit 109 to an image.

As illustrated in FIG. 10, first, the imaging unit 101 acquires an image (S201). Then, the area specifying unit 105 specifies an area designated by the user or an area determined to have an achromatic color by the area specifying unit 105 in the acquired image (S203). Then, the image processing unit 107 applies a white balance prepared in the information processing device 1 in advance to an image (S205).

Further, the evaluating unit 109 calculates a distance between coordinates of a color of the area specified by the area specifying unit 105 and coordinates of an achromatic color in the color space (S207). Further, the evaluating unit 109 evaluates a white balance applied to an image based on the calculated distance in the color space (S209). Then, the display generating unit 113 generates a display representing an evaluation result based on an evaluation result of the white balance obtained by the evaluating unit 109 (S211).

Further, the information processing device 1 performs the operation of S205 to S211 on each of a plurality of white balances which are prepared in advance in a loop manner. Specifically, the information processing device 1 applies each of white balances which are prepared in advance to an image, calculates respective evaluation results, and generates displays representing the evaluation results. Here, the adjusting unit 111 determines a white balance having the best evaluation result among the evaluated white balances as a finally decided white balance through the process of S205 to S211. In this case, the display generating unit 113 generates an image to which the finally decided white balance has been applied (S213).

According to the second exemplary operation of the information processing device 1, when previously prepared white balances are applied to an image, it is possible to apply a white balance which is evaluated to be best to an image as an appropriate white balance. Further, when the user selects a white balance to be applied to an image, the user can select an optimal white balance based on evaluation results of respective white balances.

<3. Exemplary Hardware Configuration of Information Processing Device According to Embodiment of Present Disclosure>

The information processing device 1 according to the embodiment of the present disclosure has been described above in detail. The information processing performed by the information processing device 1 is implemented by collaboration between software and hardware of the information processing device 1 which will be described below with reference to FIG. 11.

Figure 11:
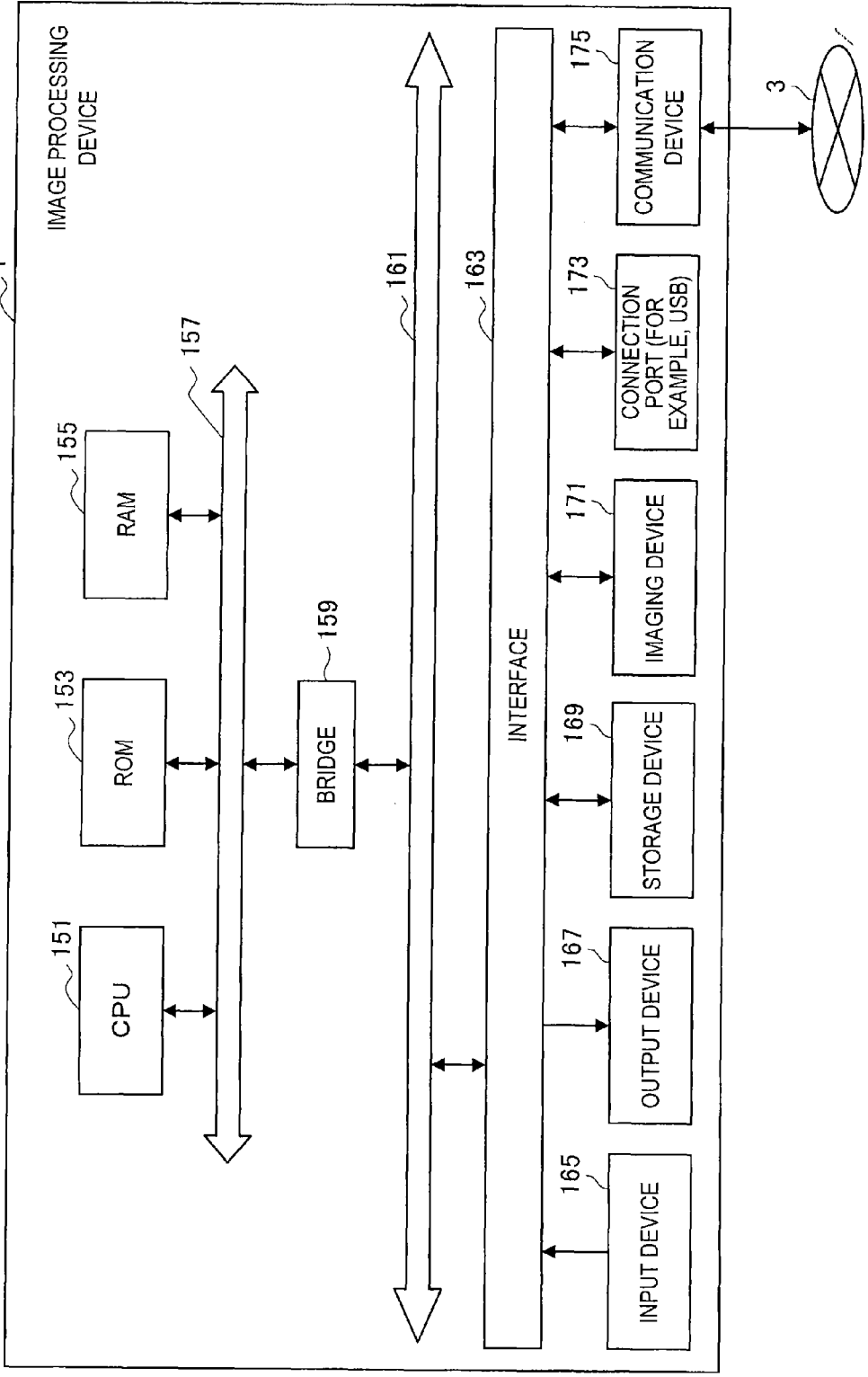
FIG. 11 is an explanatory diagram illustrating a hardware configuration of the information processing device according to the embodiment.

FIG. 11 is an explanatory diagram illustrating an exemplary hardware configuration of the information processing device 1. As illustrated in FIG. 11, the information processing device 1 includes a central processing unit (CPU) 151, a read only memory (ROM) 153, a random access memory (RAM) 155, an input device 165, an output device 167, a storage device 169, an imaging device 171, a connection port 173, and a communication device 175.

The CPU 151 functions as an arithmetic processing device and a control device, and controls an overall operation of the information processing device 1 according to various kinds of programs. Further, the CPU 151 may be a microprocessor, and may include a separate circuit that performs arithmetic processing dedicated to image processing. Further, the imaging device 171 may be equipped with a circuit that performs arithmetic processing dedicated to image processing.

The ROM 153 stores a program, an operation parameter, and the like used by the CPU 151, and the RAM 155 temporarily stores a program used in execution of the CPU 151, a parameter that appropriately changes in the execution, and the like. Further, the CPU 151 executes, for example, the functions of the area specifying unit 105, the image processing unit 107, the evaluating unit 109, the adjusting unit 111, and the display generating unit 113.

The CPU 151, the ROM 153, and the RAM 155 are connected to one another through a bridge 159, internal buses 157 and 161, and the like. Further, the CPU 151, the ROM 153, and the RAM 155 are connected with the input device 165, the output device 167, the storage device 169, the imaging device 171, the connection port 173, the communication device 175, and the like through an interface 163.

The input device 165 is configured with an input unit used when the user inputs information such as a touch panel, a button, a switch, a lever, a dial, or a microphone, an input control circuit that generates an input signal based on the user's input, and outputs the input signal to the CPU 151, and the like. For example, the input device 165 executes the function of the operating unit 115.

For example, the output device 167 includes a display device such as an LCD device, an OLED device, or a lamp. The output device 167 may further include an audio output device such as a speaker or a headphone. For example, the display device displays an imaged image or a generated image. Meanwhile, the audio output device converts audio data or the like into sound, and outputs the sound. For example, the output device 167 executes the function of the display unit 103. Here, the input device 165 and the output device 167 with which the information processing device 1 is equipped may be a touch panel display device in which both devices are integrated.

The storage device 169 is a data storage device configured as an example of a storage unit of the information processing device 1. The storage device 169 may include a storage medium, a storing device that stores data in the storage medium, a reading device that reads data from the storage medium, and a deleting device that deletes stored data.

The imaging device 171 includes an imaging element such as a CMOS image sensor or a CCD image sensor and an imaging lens. The imaging device 171 receives light incident from a subject through the imaging lens, performs photoelectric conversion through the imaging element to convert the light into an image signal, and acquires an image of the subject.

For example, the connection port 173 is a connection interface configured with a connection port used to connect an external connecting device such as a Universal Serial Bus (USB) port or an optical audio terminal.

For example, the communication device 175 is a communication interface configured with a communication device that is connected to a network 3 and the like. Further, the communication device 175 may be a wireless LAN communication device or a cable communication device that performs wired cable communication.

Further, the network 3 is a wired or wireless transmission path for information to be transmitted and received between devices connected to the network 3. Examples of the network 3 include a public line network such as the Internet, a telephone line, a satellite communication network, a LAN, and a wide area network (WAN).

Further, it is possible to create a computer program causing hardware such as the CPU, the ROM, and RAM with which the information processing device 1 is equipped to perform functions equivalent to the respective functions of the information processing device 1. Further, a storage medium storing the computer program is also provided.

<4. Conclusion>

As described above, the information processing device 1 according to the embodiment of the present disclosure can evaluate a white balance applied to an image and generate a display representing an evaluation result. Specifically, the information processing device 1 specifies an area determined to have an achromatic color on an image to which a white balance has been applied, and calculates a distance between coordinates of a color of the specified area and coordinates of an achromatic color in the color space. Further, the information processing device 1 can evaluate a white balance applied to the image based on the calculated distance and generate a display representing an evaluation result. Thus, the user can more easily determine whether or not a white balance applied to an image is appropriate by checking the evaluation result generated by the information processing device.

Further, the information processing device 1 according to the embodiment of the present disclosure displays an evaluation result of a white balance for the user, and thus the user can adjust a white balance to be applied to an image while checking the evaluation result. Further, when a previously prepared white balance is applied to an image, the information processing device 1 can select an optimal white balance. Thus, the user can apply a more appropriate white balance to an image.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely for explanatory or exemplary purposes, and are not limiting. In other words, the technology related to the present disclosure can obtain other effects which are obvious to a person skilled in the art from the description of this specification together with the above-described effects or instead of the above-described effects.

(1) An information processing device includes:
circuitry configured to
generate a white balance evaluation result based on a user designated portion in an image; and
control a display of an indication of the while balance evaluation result with the image.

(2) The information processing device of (1), further comprising:
an image sensor configured to capture the image, wherein the image sensor, and the circuitry are included in a camera or a device including the camera.

(3) The information processing device of (1), wherein
the white balance evaluation result is a classification of white balance and is different than a white balance score.

(4) The information processing device of (3), wherein
the white balance evaluation result is an indication of distance in a color space from a predetermined location in the color space.

(5) The information processing device of (3), wherein
the white space evaluation result is a text, indication.

(6) The information processing device of (3), wherein
the white space evaluation result is represented as a meter having a range, and an indication of the white space evaluation result is displayed at a position within the range, the range representing a range of white balance scores.

(7) The information processing device of (6), wherein
the meter includes an indication of a natural tone as a displayed threshold, and a relative position of the indication of white space evaluation result with respect to the threshold to provide an indication of a user-adjustable white balance setting that will adjust a white balance of the image to fall within a recommended range.

(8) The information processing device of (4), wherein
the white space evaluation results is represented as a gauge having a range, and an indication of the white space evaluation result is displayed at a position with respect to the range, the range representing a range of white balance scores.

(9) The information processing device of (8), wherein
the gauge includes an indication of a natural tone as a displayed threshold, and a relative position of the indication of white space evaluation result, with respect to the threshold provides an indication of a user-adjustable white balance setting that will adjust a white space of the image to fall within a recommended range.

(10) The information processing device of (1), wherein
the circuitry is further configured to enable the user-designated portion to be set to a user-specified area in the image.

(11) The information processing device of (1), wherein
the circuitry is further configured to enable the user-designated portion to be selected from a set of predetermined sub-areas of the image.

(12) The information processing device of claim (1), wherein
the circuitry is further configured to enable the user-designated portion to be set to a user-specified area in the image based on RGB data in the image.

(13) The information processing device of (12), wherein
the area specifying unit is configured to specify the user specified area by identifying coordinates within the image that are within a predetermined color distance of the user designation portion.

(14) The information processing device of (1), wherein
the circuitry is further configured to compare the user designated portion in the image with a predetermined color on a color map.

(15) An information processing method comprising: generating with circuitry a white balance evaluation result based on a user designated portion in an image; and controlling a display of an indication of the white balance evaluation result with the image.

(16) The method of (15), wherein
the white balance evaluation result is a classification of white balance other than a white balance score.

(17) The method of (16), wherein
the white balance evaluation result is an indication of distance in a color space from a predetermined location in the color space.

(18) The method of (15), wherein
the white space evaluation result is a text indication.

(19) The method of (15), wherein
the white space evaluation result is represented as a meter having a range, and an indication of the white space evaluation result is displayed at a position within the range, the range representing a range of white balance scores.

(20) The method of claim (15) wherein
the white space evaluation result is represented as a gauge having a range, and an indication of the white space evaluation result is displayed at a position with respect to the range, the range representing a range of white balance scores.

(21). The method of (15), further comprising:
comparing with the circuitry the user-designated portion in an image with a predetermined color on a color map.

(22) A non-transitory computer readable storage medium having a program stored therein that when executed by processing circuitry causes the processing circuitry to execute an information processing method, the method comprising:
generating with the processing circuitry a white balance evaluation result, based on a designated portion in an image; and
controlling a display of an indication of the white balance evaluation result with the image.

The invention claimed is:

1. An information processing device comprising:
circuitry configured to
generate a white balance evaluation result based on a user designated portion in an image;
enable the user designated portion to be set to a user-specified area in the image based on RGB data in the image;
specify the user-specified area by identifying color coordinates within the image that are within a predetermined color distance of the user designation portion; and
control a display of an indication of the white balance evaluation result with the image;
wherein the white balance evaluation result is an indication of distance in the color coordinates in a color space from a location in the color coordinates in the color space of an achromatic color in the user designated portion.

2. The information processing device of claim 1, further comprising:
an image sensor configured to capture the image, wherein the image sensor, and the circuitry are included in a camera or a device including the camera.

3. The information processing device of claim 1, wherein
the white balance evaluation result is a classification of white balance and is different than a white balance score.

4. The information processing device of claim 3, wherein
the white space evaluation result is a text indication.

5. The information processing device of claim 3 wherein
the white space evaluation result is represented as a meter having a range, and an indication of the white space evaluation result is displayed at a position within the range, the range representing a range of white balance scores.

6. The information processing device of claim 5, wherein
the meter includes an indication of a natural tone as a displayed threshold, and a relative position of the indication of white space evaluation result with respect to the threshold to provide an indication of a user-adjustable white balance setting that will adjust a white balance of the image to fall within a recommended range.

7. The information processing device of claim 1, wherein
the white space evaluation results is represented as a gauge having a range, and an indication of the white space evaluation result is displayed at a position with respect to the range, the range representing a range of white balance scores.

8. The information processing device of claim 7, wherein
the gauge includes an indication of a natural tone as a displayed threshold, and a relative position of the indication of white space evaluation result with respect to the threshold provides an indication of a user-adjustable white balance setting that will adjust a white space of the image to fall within a recommended range.

9. The information processing device of claim 1, wherein the circuitry is further configured to enable the user designated portion to be set to a user-specified area in the image.

10. The information processing device of claim 1, wherein
the circuitry is further configured to enable the user designated portion to be selected from a set of predetermined sub-areas of the image.

11. The information processing device of claim 1, wherein the circuitry is further configured to compare the user designated portion in the image with a predetermined color on a color map.

12. An information processing method comprising:
generating with circuitry a white balance evaluation result based on a user designated portion in an image;
enabling, with the circuitry, the user designated portion to be set to a user-specified area in the image based on RGB data in the image;
specifying, with the circuitry, the user-specified area by identifying color coordinates within the image that are within a predetermined color distance of the user designation portion; and
controlling a display of an indication of the white balance evaluation result with the image;
wherein the white balance evaluation result is an indication of distance in the color coordinates in a color space from a location in the color coordinates in the color space of an achromatic color in the user designated portion.

13. The method of claim 12, wherein
the white balance evaluation result is a classification of white balance and is different than a white balance score.

14. The method of claim 12, wherein
the white space evaluation result is a text indication.

15. The method of claim 12, wherein
the white space evaluation result is represented as a meter having a range, and an indication of the white space evaluation result is displayed at a position within the range, the range representing a range of white balance scores.

16. The method of claim 12, wherein
the white space evaluation result is represented as a gauge having a range, and an indication of the white space evaluation result is displayed at a position with respect to the range, the range representing a range of white balance scores.

17. The method of claim 12, further comprising:
comparing with the circuitry the user designated portion in an image with a predetermined color on a color map.

18. A non-transitory computer readable storage medium having a program stored therein that when executed by processing circuitry causes the processing circuitry to execute an information processing method, the method comprising:
generating with the processing circuitry a white balance evaluation result based on a user designated portion in an image;
enabling the user designated portion to be set to a user-specified area in the image based on RGB data in the image;
specifying the user-specified area by identifying color coordinates within the image that are within a predetermined color distance of the user designation portion; and
controlling a display of an indication of the white balance evaluation result with the images;
wherein the white balance evaluation result is an indication of distance in the color coordinates in a color space from a location in the color coordinates in the color space of an achromatic color in the user designated portion.

* * * * *